(12) United States Patent
Takahashi (10) Patent No.: US 6,717,348 B2
(45) Date of Patent: Apr. 6, 2004

(54) DISPLAY APPARATUS

(75) Inventor: Kenji Takahashi, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 414 days.

(21) Appl. No.: 09/729,859

(22) Filed: Dec. 6, 2000

(65) Prior Publication Data

US 2001/0019240 A1 Sep. 6, 2001

(30) Foreign Application Priority Data

Dec. 9, 1999 (JP) .......................................... 11-349633

(51) Int. Cl.[7] .................................................. H01J 1/62
(52) U.S. Cl. ...................... 313/483; 313/484; 313/485; 313/486
(58) Field of Search ................................ 313/483–486, 313/467, 461, 525, 527, 543; 349/61, 70, 71

(56) References Cited

U.S. PATENT DOCUMENTS

| 4,822,144 | A | | 4/1989 | Vriens | 356/339 F |
|---|---|---|---|---|---|
| 5,608,554 | A | | 3/1997 | Do et al. | 349/70 |
| 5,666,174 | A | * | 9/1997 | Cupolo, III | 349/64 |
| 5,926,239 | A | * | 7/1999 | Kumar et al. | 349/69 |
| 6,104,456 | A | * | 8/2000 | Davey | 349/71 |
| 6,147,456 | A | * | 11/2000 | Janning | 315/169.3 |
| 6,357,889 | B1 | * | 3/2002 | Duggal et al. | 362/84 |

FOREIGN PATENT DOCUMENTS

WO    WO 95 27920    10/1995

* cited by examiner

Primary Examiner—Edward J. Glick
Assistant Examiner—Jurie Yun
(74) Attorney, Agent, or Firm—Sughrue Mion, PLLC (57) ABSTRACT

A display apparatus has a light source unit for generating excitation light, an optical element for modulating the excitation light generated by the light source unit for each of pixels in a two-dimensional plane, and a fluorescent screen for receiving the excitation light modulated by the optical element at a first surface and emitting visible light from a second surface opposite to the first surface. The fluorescent screen includes a layer of phosphor having an absorption coefficient of $1 \times 10^2$ cm$^{-1}$ or more for the excitation light.

26 Claims, 6 Drawing Sheets

| | SPECIMEN No. | THICKNESS (μm) | ABSORPTION COEFFICIENT (cm⁻¹) | BRIGHTNESS | SHARPNESS |
|---|---|---|---|---|---|
| EMBODIMENTS | 1-1 | 7 | 1600 | 94 | |
| | 1-2 | 13 | | 100 | ◎ |
| | 1-3 | 35 | | 75 | |
| | 2-1 | 15 | 300 | 24 | |
| | 2-2 | 40 | | 66 | |
| | 2-3 | 80 | | 100 | ○ |
| | 2-4 | 123 | | 99 | |
| | 2-5 | 165 | | 91 | |
| | 3-1 | 23 | 700 | 78 | |
| | 3-2 | 57 | | 100 | ○ |
| | 3-3 | 90 | | 97 | |
| | 4-1 | 15 | 1000 | 86 | |
| | 4-2 | 40 | | 100 | ◎ |
| | 4-3 | 80 | | 72 | |
| | 5-1 | 22 | 600 | 71 | |
| | 5-2 | 37 | | 94 | |
| | 5-3 | 52 | | 100 | ○ |
| | 5-4 | 64 | | 100 | ○ |
| | 6-1 | 18 | 600 | 71 | |
| | 6-2 | 35 | | 94 | |
| | 6-3 | 55 | | 100 | ○ |
| | 6-4 | 66 | | 99 | |
| COMPARISONS | 1-1 | 10 | LESS THAN 100 | 25 | |
| | 1-2 | 20 | | 32 | |
| | 1-3 | 43 | | 50 | |
| | 1-4 | 83 | | 67 | |
| | 1-5 | 125 | | 96 | |
| | 1-6 | 164 | | 100 | × |

DISPLAY APPARATUS

BACKGROUND OF THE INVENTION

1. Field of the Invention

The present invention relates to a display apparatus and more specifically to a photoluminescent display apparatus which makes an image, that has been formed by modulating excitation light such as ultraviolet rays generated from a light source by using a liquid crystal panel or the like, to be visible by a phosphor screen and displays it.

2. Description of a Related Art

There is a growing use in recent years of liquid crystal displays (LCDs) taking the place of cathode-ray tubes (CRTs) as displays for flat televisions and computers. The LCDs are also being considered for diagnostic by monitoring in medical equipment, such as ultrasonic apparatus, CT apparatus, MRI apparatus and CR apparatus, and also for viewing art works and for use in large information display equipment in airports.

Prior art LCDs, though with their advantages of being small in size and light in weight, have a drawback of a large dependence on an angle of view. That is, when the viewing direction is perpendicular to the display surface, the luminance is maximum. As the viewing direction shifts away from being perpendicular, the luminance and contrast sharply decrease and the tone reverses, so that how the image appears changes depending on the angle of view.

To eliminate the angle-of-view dependence and increase the brightness, a photoluminescent liquid crystal display (PL-LCD) has been developed in recent years. The basic principle of the PL-LCD is that an image formed by modulating excitation light such as ultraviolet rays generated from a light source by using a liquid crystal panel or the like is made visible by a phosphor screen and displayed. The image displayed on the PL-LCD is a fluorescent image similar to that formed on a CRT, and is thus not dependent on the viewing angle. Further, when a color image is to be displayed, three color phosphors need only be coated non-overlappingly as in the CRT, obviating the need for color filters, which in turn is expected to enhance an efficiency. It is known, however, that random directions of excitation light incident on the liquid crystal cells cause fuzziness and a reduced contrast of the image. Japanese Patent Application Publication JP-A-9-511588, which corresponds to WO-A-95-27920, discloses a display screen having a light collecting member in cells of liquid crystal layer in order to improve the PL-LCD.

The criterion in selecting the phosphor used in the photoluminescent display apparatus takes into account only whether the phosphor in question has a high efficiency of excitation by ultraviolet rays or blue light rays. For example, U.S. Pat. No. 5,608,554 discloses a display apparatus which uses three kinds of phosphors that emit three colors, red, green and blue (RGB), respectively, rather than filtering a white beam of light produced by a light source through color filters to disperse light into three RGB colors. Among the phosphors selected for such a use are the ones that have a good emission spectrum when exposed to deep blue excitation light from a backlight that has a main radiation peak in the wavelength range of 380 nm to 420 nm. Further, Journal of Applied Physics 88.4660 (2000) discloses a phosphor having high excitation efficiency at wavelengths of 365 nm and 394 nm.

The excitation efficiency for ultraviolet radiations mentioned above is a concept used in evaluating phosphors and is normally measured by radiating the excitation light against the surface of a phosphor layer thick enough to absorb the excitation light and by observing the luminescence light emitted from the same surface. The excitation efficiency measured by this manner, however, greatly differs from an effective efficiency which is obtained by observing the luminescence light emitted from the side of the phosphor layer opposite to the excitation light irradiated surface. In this arrangement, the relation between the sharpness and the layer thickness also differs from that of the conventional arrangement, and the layer thickness that provides the high sharpness required for the diagnostic using the CR apparatus is, for example, 120 $\mu$m or less, which will be described later in detail.

The phosphors used in the conventional PL-LCD have high excitation efficiencies for ultraviolet rays or the like but many of them cannot absorb the excitation light sufficiently. Hence, relatively reducing the thickness of the phosphor layer to realize a high sharpness results in a low energy efficiency when observed from the surface opposite to the excitation light irradiated surface, which poses a problem in putting it into practical use. On the other hand, increasing the layer thickness to raise the energy efficiency results in a reduced sharpness. Thus it is impossible to achieve both the high brightness and the high precision at the same time. Conversely, too high an absorption of the excitation light results in only the shallow surface of the phosphor layer being excited, thus reducing the energy efficiency.

U.S. Pat. No. 4,822,144 discloses a display apparatus in which an interference filter layer that transmits ultraviolet rays but reflects visible rays is provided between the excitation backlight portion and the phosphor layer to reduce the loss of the visible rays of light occurring in the phosphor layer.

SUMMARY OF THE INVENTION

In view of the aforementioned problems, it is an object of the present invention to provide a display apparatus such as PL-LCD in which excitation light is radiated against the back of the phosphor layer to produce luminescent light from the front and which can realize an image with high sharpness, high brightness and high contrast with high efficiency.

The contact type display apparatus according to the present invention comprises: a light source unit for generating excitation light having a predetermined wavelength; an optical element for modulating the excitation light generated by the light source unit for each of pixels in a two-dimensional plane; and a fluorescent screen for receiving the excitation light modulated by the optical element at a first surface and emitting visible light from a second surface opposite to the first surface.

The rear projection type display apparatus according to the present invention comprises: a light source unit for generating excitation light having a predetermined wavelength; an optical element for modulating the excitation light generated by the light source unit for each of pixels in a two-dimensional plane; a projection lens to project the excitation light modulated by the optical element; and a fluorescent screen for receiving the excitation light projected by the projection lens at a first surface and emitting visible light from a second surface opposite to the first surface.

According to a first aspect of the present invention, the fluorescent screen includes a layer of phosphor having an absorption coefficient not smaller than $1 \times 10^2$ cm$^{-1}$ for the excitation light. The phosphor layer should preferably be 120 μm or less thick to enhance the brightness and sharpness. In this application the absorption coefficient refers to an apparent absorption coefficient and a method of evaluating it will be detailed later.

According to a second aspect of the present invention, the fluorescent screen includes a layer of phosphor in which a thickness of the layer of phosphor that gives a maximum brightness caused by the excitation light is not larger than 120 μm. More preferably, the thickness that gives the maximum brightness is 80 μm or less.

According to a third aspect of the present invention, the fluorescent screen includes a layer of phosphor in which a product of an absorption coefficient for the excitation light and a thickness of the layer of phosphor is within a range from 1 to 8. More preferably, the product of the absorption coefficient and the layer thickness is within a range from 2 to 4. It is also desired that the thickness of the phosphor layer be 120 μm or less to enhance the brightness and sharpness.

With the above configurations, in a system that radiates excitation light against the back of the phosphor layer to produce luminescent light from the front of the phosphor layer, because the excitation light is properly absorbed in the phosphor layer to produce visible light, an image with high sharpness, high brightness and high contrast can be obtained with high efficiency.

DESCRIPTION OF THE PREFERRED EMBODIMENTS

Now, embodiments of the present invention will be described by referring to the accompanying drawings.

Figure 1:
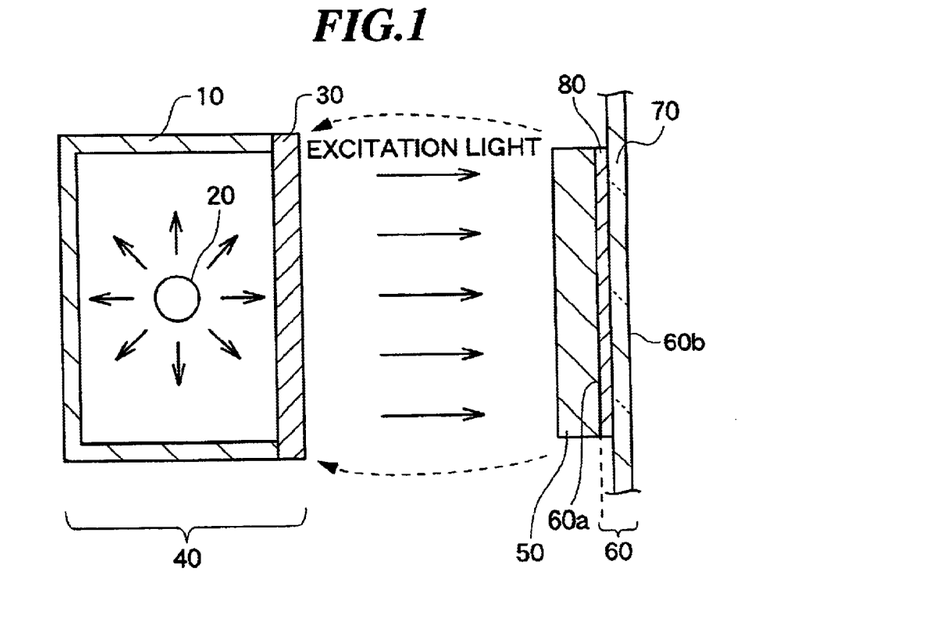
FIG. 1 is a cross section showing the working principle of a display apparatus according to a first embodiment of the present invention.

FIG. 1 is a cross section showing the working principle of the display apparatus (contact type) according to the first embodiment of the invention. This display apparatus has a light source unit (backlight) 40 to generate rays of excitation light. The excitation light generated by the light source unit 40 enters an optical element 50. The optical element 50 has many pixels in a two-dimensional plane and modulates the excitation light at each pixel. The excitation light modulated by the optical element 50 is incident on a first surface (back surface 60a) of a fluorescent screen 60. The fluorescent screen 60 emits visible rays of light from a second surface (front surface 60b) opposite to the first surface. Such a display apparatus is called as a contact type because the optical element 50 and the fluorescent screen 60 are in contact with each other.

The light source unit 40 has a housing 10, a fluorescent lamp 20 as a light source installed inside the housing 10, and a bead collimator 30 installed on the surface of the housing 10 on the optical element 50 side. The bead collimator 30 transforms the excitation light emitted from the fluorescent lamp 20 into light with directivity (also referred to as collimated light). As the light source, an LED (light emitting diode) or an ultrahigh-pressure mercury-arc lamp may be used instead of the fluorescent lamp.

Appropriate excitation light is ultraviolet light having a wavelength within a range from approximately 360 nm to approximately 380 nm, and violet or deep blue light having a wavelength within a range from approximately 380 nm to approximately 420 nm. Particularly appropriate light has a wavelength within a range from 360 nm to 410 nm and preferably has a peak near a wavelength of 390 nm. Too short a wavelength may result in the excitation light being absorbed by the modulating optical element or damaging the optical element. On the other hand, too long a wavelength will reduce the excitation efficiency of the phosphor.

To transform diffused excitation light into sufficiently collimated light, it is desired that a bead collimator or a multilayer filter is used. In this embodiment, the bead collimator 30 is used.

Figure 2:
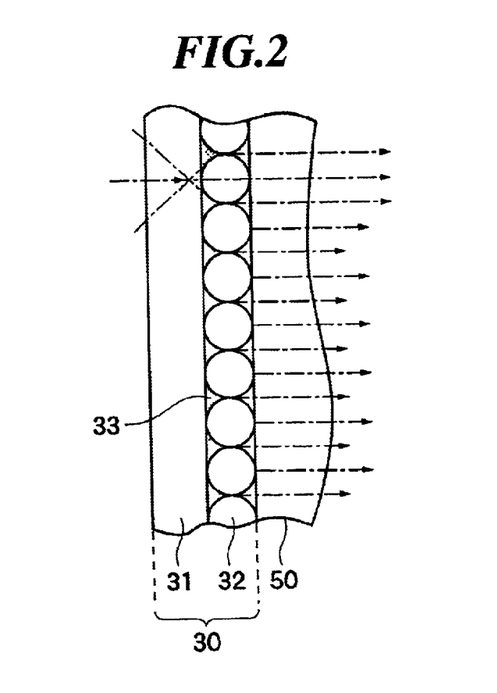
FIG. 2 schematically illustrates the construction of a bead collimator 30 in the display apparatus as shown in FIG. 1.

FIG. 2 shows the construction of the bead collimator 30. As shown in FIG. 2, the bead collimator 30 has a light transmitting support sheet 31 and light transmitting spherical members (hereinafter referred to as beads) 32 partly in contact with and supported by the support sheet 31. To secure the beads 32 to the support sheet 31, a light reflecting bonding agent 33 is filled between them. The light reflecting bonding agent 33 also has a function of blocking the light from passing through areas other than the contact portions between the support sheet 31 and the beads 32 and their vicinities. The bead collimator 30 is arranged with the bead side directed toward the optical element 50. The scattered light radiated from the fluorescent lamp 20 enters into the beads 32 only from the contact portions between the support sheet and the beads and from their vicinities, bends by the effect of the spherical beads and is collected into collimated light.

The light reflecting bonding agent 33 is a light diffusing material dispersed in the bonding agent. When the light diffusing material includes fine gaps, a stronger light scattering can be realized. A light diffusing material preferably has a refractive index of 1.6 or higher and suitable materials include, for example, fine particles of alumina ($Al_2O_3$), barium sulfate ($BaSO_4$) or titanium oxide ($TiO_2$). By using such material, the light diffusion (reflection) can be achieved with good efficiency. Rather than using a binder, it is possible to use a metal thin film to form an optical reflection film at locations other than the contact portions between the beads 32 and the support sheet 31 and their vicinities. In this case, a multiple reflection occurs and it lowers the efficiency.

Further, the use of a light-absorbing agent instead of the light diffusing material, though with a decreased efficiency, can also provide the light collecting action. Alternatively, a photosensitive developing material or a heat sensitive abrasion material may be used to form a black mask at locations other than the contact portions between the beads 32 and the support sheet 31 and their vicinities. A combined use of the light reflection film and the black mask is also effective.

Although this embodiment uses a combination of the fluorescent lamp and the bead collimator as the light source unit 40, the invention is not limited to this configuration. Other possible configurations include, for example, a combination of LED and microlens arrays, a combination of an ultrahigh-pressure mercury-arc lamp and an optical filter which cuts a most part of the visible light, and various other known light sources used for LCDS.

Next, with reference to FIG. 3, the fluorescent screen 60 included in the display apparatus of this embodiment will be described in detail.

The fluorescent screen 60 includes a substrate 70 and a phosphor layer 80 formed over the substrate 70. The substrate 70 transmits visible light emitted from the phosphor and a glass substrate may be used. Preferably, on the back or front surface of the substrate 70, an optical filter is provided which transmits only the luminescence light generated by the phosphor layer 80 and which absorbs or reflects the excitation light generated by the light source unit. It is also desired that a reflection prevention film for preventing reflection of external light is provided on the front surface of the substrate 70.

Figure 3:
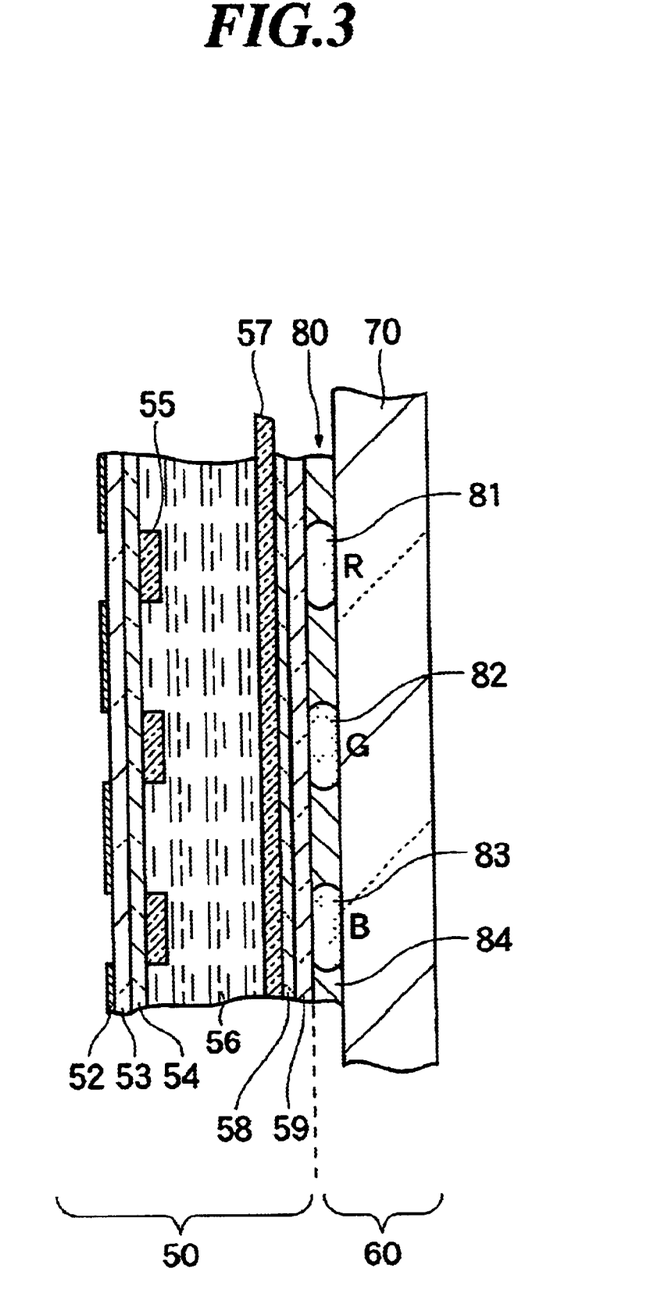
FIG. 3 is a cross section showing the construction of an optical element 50 and a fluorescent screen 60 in the display apparatus as shown in FIG. 1.

In the case of a color display apparatus, as shown in FIG. 3, three phosphor dots 81, 82 and 83 of red, green and blue (RGB) are provided for each pixel in the phosphor layer 80. A space between these dots is filled with a black matrix 84. In the case of a monochromatic display apparatus, a single phosphor dot is used for each pixel, or the screen may be formed in a uniform structure without a one-to-one correspondence between the pixels and the phosphor dots.

The phosphor layer 80 is made by dispersing the phosphor particles in an acrylic resin binder dissolved with an organic solvent such as MEK or toluene and then applying it over the substrate 70. Alternatively, in the same manner as a method of manufacturing phosphor films in CRT, the phosphor dots may be formed by using photo resist. Further, the phosphor dots may be formed in the same manner as a method of manufacturing a color filter used in a liquid crystal display. This manufacturing method includes a method using transer, a method using inkjet or a method of screen printing.

It is not sufficient that the phosphor simply has high excitation efficiency for ultraviolet light or blue light. When the thickness of the phosphor layer 80 is set to realize a high sharpness, the practical energy efficiency as observed from the surface opposite the excitation light irradiated surface must be large. To this end, the phosphor layer 80 needs to have a relatively large capability of absorbing the excitation light emitted from the light source unit 40. If the capability to absorb the excitation light is too large, however, only a shallow surface of the phosphor layer 80 is stimulated and the emitted light attenuates inside the phosphor layer 80, also reducing the energy efficiency. Hence, the absorption coefficient representing the capability of absorbing the excitation light needs to fall within a certain range.

Figure 4:
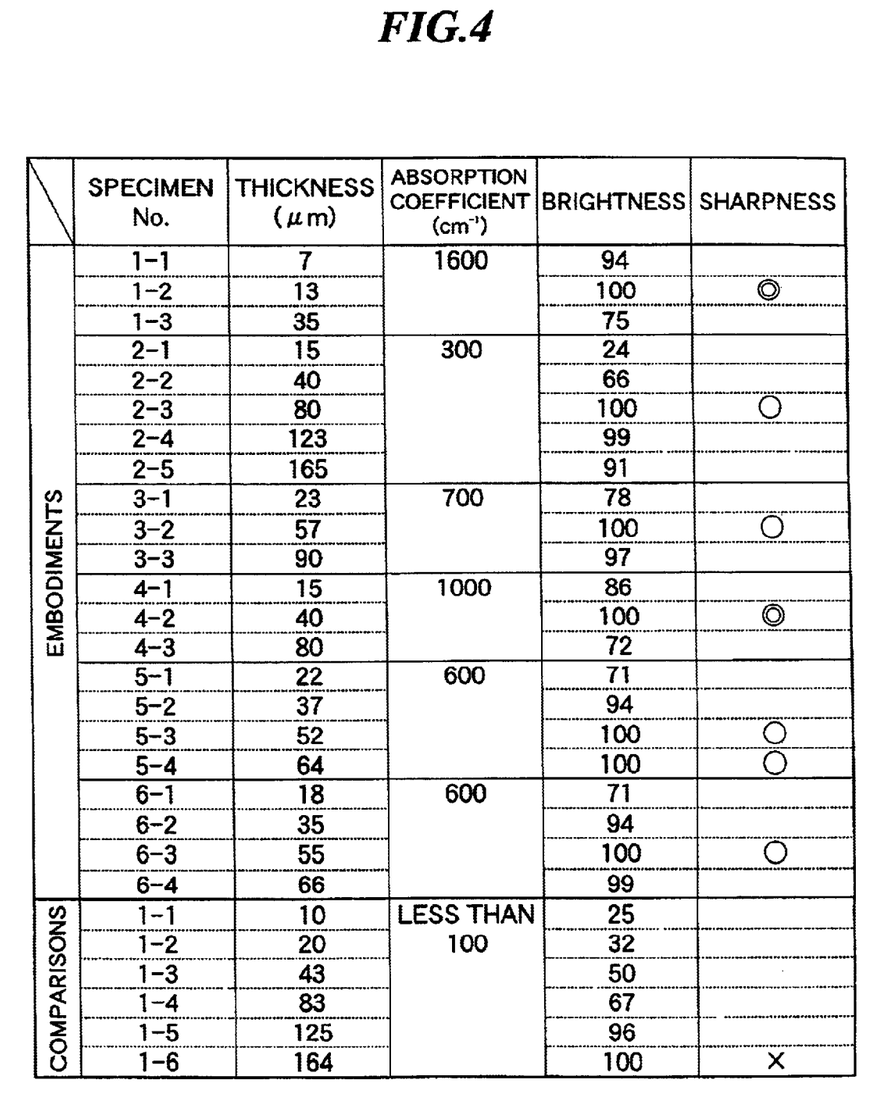
FIG. 4 is a table showing the measurements of absorption coefficients, brightness and sharpness of a variety of phosphor layers formed by changing the material, binder ratio and layer thickness.

FIG. 4 shows the result of measuring absorption coefficient, brightness and sharpness of a variety of phosphor layers with different phosphor materials, binder ratios and thicknesses. Although excitation light having a peak at the wavelength of 390 nm is used in the measurement, almost the same result would be obtained by using excitation light having a wavelength within a range from 350 nm to 420 nm. Especially, excitation light having a wavelength within a range from 360 nm to 410 nm is suitable. The grain size of the phosphor is 5–10 μm in median diameter and acrylic resin is used as a binder. As for the brightness, FIG. 4 shows a relative brightness with 100 representing the highest brightness among each group of specimens. The sharpness is evaluated only for one specimen in each group having a thickness that gives the highest brightness. Although some specimens with smaller thicknesses provide good sharpness, the thinner specimens have reduced energy efficiencies and hence the specimen that has a thickness giving the highest brightness in each group is taken as a representative in that group.

The absorption coefficient refers to an apparent absorption coefficient, the evaluation of which is defined as follows.

Figure 5A:
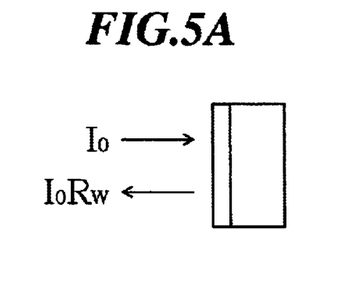
FIGS. 5A and 5B are schematic diagrams for explaining a method of measuring reflectance in determining an apparent absorption coefficient of the phosphor.
Figure 5B:
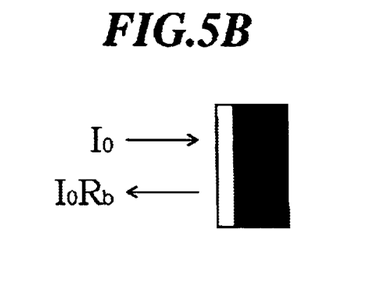

It is assumed that the phosphor layer is a uniform layer with a thickness of d, and that the reflectance and transmittance of the phosphor layer when placed in a space in isolation are r and t, respectively. The measurement of the reflectance is determined in comparison with a standard white plate. The measured value of the reflectance of the whole system is assumed to be $R_w$ when a white plate having a reflectance of $r_w$ is placed on the back of the phosphor layer as shown in FIG. 5A, and $R_b$ when a black plate having a reflectance of $r_b$ is placed on the back of the phosphor layer as shown in FIG. 5B. Since fluorescence is produced by the incident light $I_0$ entering the phosphor layer, a fluorescence spectrophotometer is used to match the wavelength of light on the measuring side with the wavelength of the incident light and the measurement is made of the reflected light $I_0R_w$ and $I_0R_b$.

The reflection of the entire system is the sum of a reflection from the phosphor layer and a reflection from the white plate or black plate and is expressed as:

$$R_w = r + r_w \cdot t^2 \qquad (1)$$

$$R_b = r + r_b \cdot t^2 \qquad (2)$$

Let the absorption coefficient of the phosphor layer be K and suppose the absorption attenuates exponentially with the thickness d of the phosphor layer. Then, from the law of energy conservation the following equation holds because the total of reflection, absorption and transmission is unity.

$$r + (1-r)\int_0^d k e^{-Kx} dx + t = 1$$

$$\therefore r + (1-r)(1-e^{-Kd}) + t = 1 \qquad (3)$$

From equations (1) and (2), we obtain the following equation:

$$R_w - R_b = (r_w - r_b) \cdot t^2$$

$$\therefore t = \{(R_w - R_b)/(r_w - r_b)\}^{1/2} \qquad (4)$$

Combining equations (1) and (4) results in the following equation:

$$r = R_w - r_w(R_w - R_b)/(r_w - r_b) \qquad (5)$$

From equations (3), (4) and (5), the absorption coefficient K is determined from the following equation:

$$K = -(1/d) \times \ln[t/(1-r)]$$

$$= -(1/d) \times \ln\left[\frac{\{(R_w - R_b)/(r_w - r_b)\}^{1/2}}{\{1 - R_w + r_w(R_w - R_b)/(r_w - r_b)\}}\right]$$

Here, if we suppose that $r_w = 1$ and $r_b = 0$, and if the measurements are $R_w = 0.5$ and $R_b = 0.1$ for $d = 10^{-3}$ cm, then $K = 3.5 \times 10^2$ cm$^{-1}$.

The feature of this evaluation method is that the measurement is taken by setting the thickness d of the phosphor layer so as to provide appropriate values of $R_w$ and $R_b$. When the values of $R_w$ and $R_b$ are almost equal, a precise absorption coefficient cannot be obtained. When scattering is large, this can be dealt with by reducing the layer thickness. In the case where a phosphor has a very large absorption coefficient, there is a possibility of $R_w \approx R_b$ even when the layer has a grain size thickness. In such a case, the measurement is taken by reducing the filling rate of the phosphor in the binder rather than reducing the thickness of the layer. The measurement result is then converted into the apparent absorption coefficient. For example, when the filling rate is halved, the calculation is made by assuming that the layer thickness is also halved.

In FIG. 4, for a group of specimens 1-1 to 1-3 with differing thicknesses, ZnO:Zn is used for the phosphor and the ratio between the phosphor and the binder (phosphor/binder) is set to 5/1. The absorption coefficient obtained is 1,600 cm$^{-1}$, which is very high. In this group, the maximum brightness is obtained at the thickness of 13 μm and the sharpness at this thickness is also excellent (marked with ⊚)

In a group of specimens 2-1 to 2-5 with different thicknesses, (Sr, Ca, Ba)$_5$(PO$_4$)$_3$Cl:Eu is used for the phosphor and the ratio between the phosphor and the binder is set to 1/1. The absorption coefficient obtained is 300 cm$^{-1}$, which is slightly low. In this group, the maximum brightness is obtained at the thickness of 80 μm and the sharpness at this thickness is also good (marked with ◯).

In a group of specimens 3-1 to 3-3 with different thicknesses, the same phosphor as used in the specimens 2-1 to 2-5 is used and the ratio between the phosphor and the binder is set to 5/1. The absorption coefficient obtained is 700 cm$^{-1}$, which is higher than the absorption coefficient of the specimen with the binder ratio of 1/1. In this group, the maximum brightness is obtained at the thickness of 57 μm and the sharpness at this thickness is also good (marked with ◯).

In a group of specimens 4-1 to 4-3 with different thicknesses, the same phosphor as used in the specimens 2-1 to 2-5 is used and the ratio between the phosphor and the binder is set to 20/1. The absorption coefficient obtained is 1,000 cm$^{-1}$, which is even higher. In this group, the maximum brightness is obtained at the thickness of 40 μm and the sharpness at this thickness is also excellent (marked with ⊚).

In a group of specimens 5-1 to 5-4 with different thicknesses, ZnS:Ag and Al/ZnS:Au, Ag, Al with a 1/1 ratio are used for the phosphor and the ratio between the phosphor and the binder is set to 5/1. The absorption coefficient obtained is 600 cm$^{-1}$. In this group, the maximum brightness is obtained at the thickness of 52 μm or 64 μm and the sharpness at these thicknesses are also good (marked with ◯).

In a group of specimens 6-1 to 6-4 with different thicknesses, ZnS:Ag and Al/ZnS:Cu, Au, Al with a 8.5/1.5 ratio are used for the phosphor and the ratio between the phosphor and the binder is set to 5/1. The absorption coefficient obtained is 600 cm$^{-1}$. In this group, the maximum brightness is obtained at the thickness of 55 μm and the sharpness at this thickness is also good (marked with ◯).

In a group of specimens for comparison 1-1 to 1-6 with different thicknesses, Y$_2$O$_3$:Eu is used for the phosphor and the ratio between the phosphor and the binder is set to 5/1. The absorption coefficient obtained is less than 100 cm$^{-1}$, which is low. In this group, the maximum brightness is obtained at the thickness of 164 μm and the sharpness at this thickness is poor (marked with X).

In the above specimens for comparison, the absorption coefficient of the phosphor is less than 1×10$^2$ cm$^{-1}$ and to secure a sufficient brightness requires increasing the thickness. Hence, a high sharpness cannot be obtained.

To obtain a high sharpness, therefore, the absorption coefficient must be 1×10$^2$ cm$^{-1}$, or higher, preferably 2×10$^2$ cm$^{-1}$ or higher. When the absorption coefficient is 3×10$^{-2}$ cm$^{-1}$ as in the specimen 2-3, a good sharpness is obtained. Further when the absorption coefficient is 1×10$^3$ cm$^{-1}$ to 1.6×10$^3$ cm$^{-1}$ as in the specimens 4-2 and 1-2, the sharpness is excellent.

It should be noted, however, that a large absorption coefficient has its disadvantage in terms of brightness. That is, because the excitation light does not penetrate deep when the absorption coefficient is large, it becomes harder for the emitted light to come out from the surface opposite the excitation light irradiated surface unless the thickness is reduced to a certain level.

Examination of the result as shown in FIG. 4 regarding the thickness of the phosphor layer has found that a significant level of brightness (99% of the maximum brightness) can be produced even with the thickness of about 120 μm as in the specimen 2-4. However, when the thickness is larger than 120 μm as in the specimen for comparison 1-6 (with a thickness of 164 μm), the sharpness deteriorates. For the thickness of 120 μm or less as in the specimen 2-3 (with a thickness of 80 μm), on the other hand, the sharpness obtained is good. Therefore, under the above condition of the absorption coefficient of the phosphor, the thickness of the phosphor layer is appropriately 120 μm or less, preferably 80 μm or less.

In practice, the apparent absorption coefficient and the optimum thickness can not be decided according to only the kind of the phosphor because they change according to the binder ratio, the particle size and so on. Therefore, it is suitable to select the thickness that gives the maximum brightness according to the material of the phosphor, the binder ratio and so on. Hence, the conditions of the absorption coefficient and the thickness can be defined by using a concept of a thickness giving the maximum brightness. That is, the thickness that provides the maximum brightness is appropriately 120 μm or less, and preferably 80 μm or less.

By using the phosphor layer having its absorption coefficient within a predetermined range, the excitation light can be absorbed sufficiently in the phosphor layer several tens of μm or less thick, realizing an image with high precision and high brightness.

Further, the appropriate condition of the phosphor layer can be defined by the product of the absorption coefficient and the thickness. When the absorption coefficient is at the minimum value of 1×10$^2$ cm$^{-1}$, the thickness can be increased only up to 120 μm and thus the product of the absorption coefficient and the thickness is 1.2 (dimensionless). When the absorption coefficient is increased to 1×10$^3$ cm$^{-1}$, a certain level of brightness (72% of the maximum brightness) can be obtained even with the thickness of 80 μm as in the specimen 4-3. The product of the absorption coefficient and the thickness for this thickness is 8. When the absorption coefficient is 1.6×10$^3$ cm$^{-1}$, 94% of the maximum brightness is produced even with the thickness of 7 μm as in the specimen 1-1 and the product of the absorption coefficient and the thickness is 1.1 in this case. It is therefore can be said that the appropriate range of the product of the absorption coefficient and the thickness is between 1 and 8. Actually, in the cases where excellent sharpness is obtained (marked with ⊚ in FIG. 4), the product of the absorption coefficient and the thickness falls in the range from 2 to 4.

As for the phosphor materials, some examples of which are listed in the above description, one or more of the following materials may be used in combination: ZnO:Zn; $(Sr, Ca, Ba)_5(PO_4)_3Cl:Eu$; ZnS:Ag, Al; ZnS:Au, Ag, Al; ZnS:Cu, Au, Al; (Zn, Cd)S:Ag; (Zn, Cd)S:Cu; $Y_2O_3$:Bi, Eu; $LiEuW_2O_8$; $Ca_8Mg(SiO_4)_4Cl_2$:Eu, Mn; $Ba_2ZnS_3$:Mn; $Y_2O_2S$:Eu; $BaMg_2Al_{16}O_{27}$:Eu; $BaMg_2Al_{16}O_{27}$:Eu, Mn; $BaMgAl_{10}O_{17}$:Eu; $BaMgAl_{10}O_{17}$:Eu, Mn; $Sr_5(PO_4)_3Cl$:Eu; (Sr, Ba)$SiO_4$:Eu; $SrGa_2S_4$:Eu; $K_5Eu_{2.5}(WO_4)_{6.75}$; ZnS:Cu, Al; and $3.5MgO·0.5MgF_2·GeO_2$:Mn.

The fluorescent screen 60 may further include a second phosphor, different from the aforementioned first phosphor, which generates visible light upon receiving the luminescence from the first phosphor. This phosphor may be used in combination with the first phosphor, or it may be provided as a separate layer on the side of the first phosphor layer opposite the excitation light irradiated side. As appropriate materials for the second phosphor, there are $Y_3Al_5O_{12}$:Ce; $Y_3(Al, Ga)_5O_{12}$:Ce; and so on.

Next, the optical element 50 included in the display apparatus of this embodiment will be described in detail by referring again to FIG. 3.

In this embodiment, a transmission type liquid crystal panel is used as the optical element 50. In the liquid crystal panel a liquid crystal layer 56 is formed between cell walls 54 and 58 on both sides. On the inner side (the right side in the figure) of the cell wall 54, first address lines 55 are provided extending in a direction perpendicular to the paper surface. On the inner side (the left side in the figure) of the cell wall 58, second address lines 57 are provided extending in a direction parallel to the paper surface. These address lines are transparent and conductive. Specifying the first address and the second address and applying a voltage to the specified address lines can change the light transmittance of the liquid crystal situated at the corresponding pixels in the two-dimensional plane in the liquid crystal layer to modulate the excitation light incident on the optical element 50. In the case of a color display apparatus, three RGB dots are allocated to each pixel.

On the outer sides of the cell walls 54 and 58, there are polarizing plates 53 and 59. To eliminate crosstalk among dots, it may be possible to form a light shielding film 52 which has predetermined grid openings corresponding to the dots.

Further, it is desired to provide between the optical element 50 and the fluorescent screen 60 or as part of these members a multilayer filter which efficiently transmits the excitation light when it enters the optical element 50 almost perpendicularly and efficiently reflects luminescent light from the fluorescent screen 60. It is also possible to use a liquid crystal panel of active matrix system using TFTs although its construction differs from that shown in FIG. 3.

Figure 6:
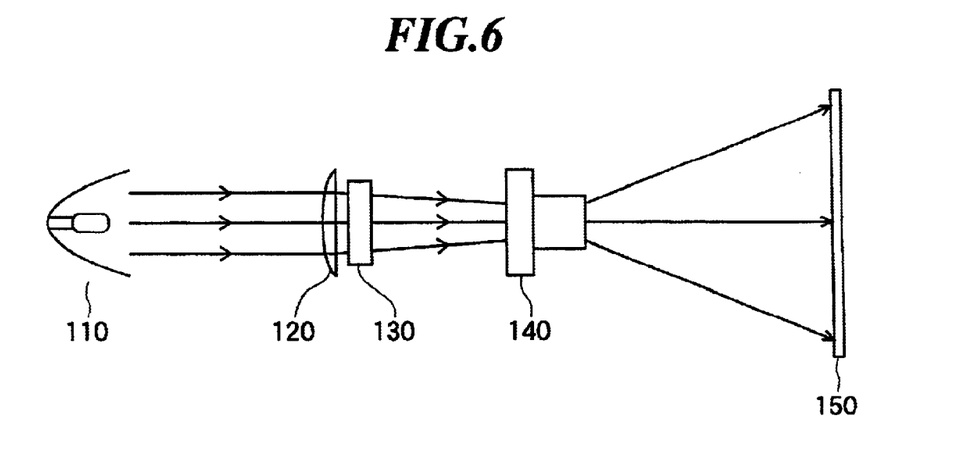
FIG. 6 illustrates a display apparatus according to a second embodiment of the invention.

Next, a display apparatus according to the second embodiment of the invention will be described with reference to FIG. 6.

The second embodiment is a rear projection type display apparatus that uses an optical element such as transmission type liquid crystal cells but resembles the first embodiment in other respects. This display apparatus has a light source unit 110 that generates excitation light. The excitation light generated by the light source unit 110 is focused on an opening of a projection lens 140 by a condenser lens 120 through an optical element 130 installed immediately after the condenser lens 120. The optical element 130 has a large number of pixels in a two-dimensional plane and modulates the excitation light for each pixel. The excitation light that has passed through the optical element 130 is projected by the projection lens 140 onto the first surface of the fluorescent screen 150. The fluorescent screen 150 produces visible rays of light that go out from the second surface opposite the first surface.

An example of a light source of the light source unit 110 is an ultrahigh-pressure mercury-arc lamp. A filter needs to be arranged in front of the optical element 130 to eliminate visible light and excess ultraviolet components. The optical element 130 may use a transmission type liquid crystal panel such as used in the first embodiment. The fluorescent screen 150 may comprise, for example, a glass substrate and a phosphor layer formed over the glass substrate. Appropriate conditions on the phosphor layer and the material of the phosphor are similar to those in the first embodiment. To reduce the size of the optical system, the optical path may be folded by using reflection mirrors.

Figure 7:
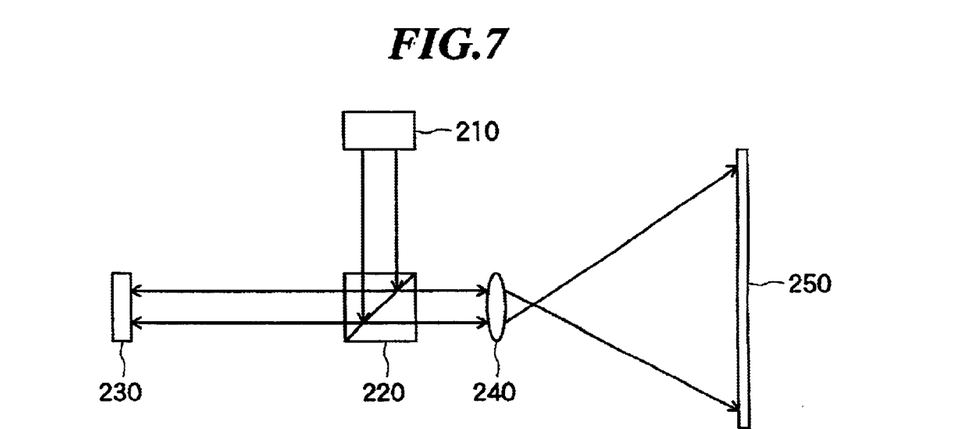
FIG. 7 illustrates a display apparatus according to a third embodiment of the invention.

Next, a display apparatus according to the third embodiment of the invention will be described by referring to FIG. 7.

The third embodiment is a rear projection type display apparatus that uses an optical element such as reflection type liquid crystal cells but in other respects are similar to the second embodiment. The display apparatus has a light source unit 210 to generate excitation light. The excitation light generated by the light source unit 210 enters a polarization beam splitter 220 from the first direction (from above in the figure). The polarization beam splitter 220 has a polarization splitter film formed therein at almost 45 degrees to the incident light. The polarization splitter film reflects only spherical waves and transmits plane waves. Hence, the polarization beam splitter 220 reflects the excitation light of spherical waves in a direction almost at right angles to the direction of incidence (toward left in the figure).

The excitation light reflected by the polarization beam splitter 220 enters an optical element 230. The optical element 230 has many pixels in a two-dimensional plane and modulates and reflects the excitation light for each pixel, which then enters the polarization beam splitter 220 again from a second direction. If an image is entirely white, the spherical waves are transformed by the crystal liquid into the plane waves which are introduced into the projection lens 240. When the image is wholly black, the spherical waves are returned by the polarization beam splitter 220 to the light source unit 210. The excitation light that has passed through the polarization beam splitter 220 is projected by the projection lens 240 onto the first surface of the fluorescent screen 250. The fluorescent screen 250 generates visible rays of light that go out from the second surface opposite the first surface.

The optical element 230 may use, for example, a reflection type liquid crystal panel having a liquid crystal layer formed on the silicon substrate. In this liquid crystal panel, specifying the first address and the second address and applying a voltage to the specified address lines can change the direction of orientation of liquid crystal molecules situated at the corresponding pixels on the two-dimensional plane in the liquid crystal layer, modulating the excitation light passing through the polarization beam splitter 220. Appropriate conditions on the phosphor layer and the material of the phosphor are similar to those in the first embodiment.

Figure 8:
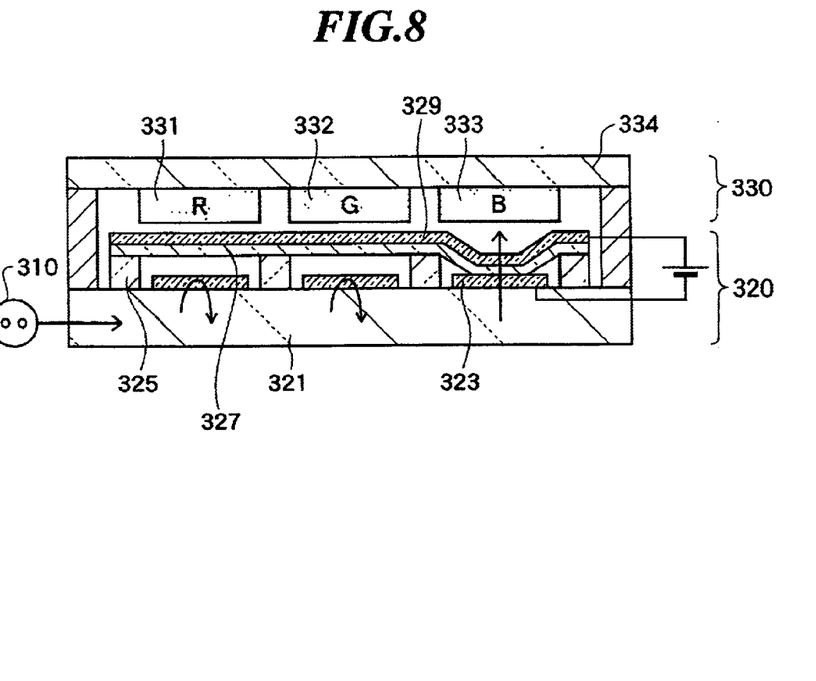
FIG. 8 is a cross section showing a display apparatus according to a fourth embodiment of the invention.

Next, a display apparatus according to the fourth embodiment of the invention will be described by referring to FIG. 8.

The fourth embodiment uses an optical modulating element instead of a liquid crystal panel as an optical element and thus has modified constructions of the light source unit and the fluorescent screen. This display apparatus has a light source unit 310 to generate excitation light. The excitation light generated by the light source unit 310 enters an optical element 320. The optical element 320 has a large number of pixels in a two-dimensional plane and modulates the excitation light for each pixel. The excitation light modulated by the optical element 320 enters the first surface of the fluorescent screen 330. The fluorescent screen 330 generates visible rays of light that go out from the second surface opposite the first surface.

An example of a light source of the light source unit 310 is a low-pressure mercury-arc lamp. The light from the light source unit 310 is introduced into a light guide 321 constituting the optical element 320. On the light guide 321 are a plurality of striplike transparent lower electrodes 323 arranged parallel to each other at predetermined intervals. Formed between the adjacent lower electrodes 323 are stays 325, which may be made, for example, by etching the same material as the light guide 321.

On the upper end faces of the stays 325 a plurality of striplike transparent flexible thin films 327 are formed parallel to each other at predetermined intervals, extending in a direction perpendicular to the lower electrodes 323. The flexible thin films 327 are spaced from the lower electrodes 323 and electrically insulating. A plurality of striplike transparent upper electrodes 329 are formed one over each of the upper surfaces of the flexible thin films 327. That is, a plurality of lower electrodes 323 and a plurality of upper electrodes 329 cross each other at right angles in a lattice pattern. Desired electrodes are selected and applied with a voltage to deflect the flexible thin films 327 downwardly in the figure by the Coulomb force.

At a location where the flexible thin film 327 is brought into contact with, or within a predetermined distance from, the lower electrode 323, the excitation light from the light source unit 310 passes through the flexible thin film 327 and the upper electrode 329. At locations where the flexible thin films 327 are sufficiently spaced from the lower electrodes 323, the excitation light is reflected by the lower electrodes 323. In this way the excitation light from the light source unit 310 can be modulated by the optical element 320.

It is desired to provide between the optical element 320 and the fluorescent screen 330 or as part of these members a multilayer filter, which efficiently transmits a component of the excitation light entering the phosphor layer perpendicularly and efficiently reflects non-perpendicular components of the excitation light and luminescent light from the phosphor layer.

Among the possible materials for the light guide 321 are transparent glass and resins such as acrylics, polyethylene terephthalate and polycarbonate.

The lower electrodes 323 or the upper electrodes 329 may use, as their materials, metal oxides such as ITO with high electron density, very thin metals or metal compounds, thin films with metal particles dispersed in transparent insulators, and heavily doped wideband gap semiconductors. The metals suited for the electrode material include gold, silver, palladium, zinc, aluminum and soon. The metal compounds suited for the electrode material include indium oxides, zinc oxides, aluminum-added zinc oxides (so-called AZO).

The materials for the flexible thin films 327 include silicon oxides, silicon nitrides, ceramics and resins.

The fluorescent screen 330 is arranged above the optical element 320 and has a transparent front plate 334 and a phosphor layer including phosphor dots 331–333 formed over the front plate 334. In the case of a color display apparatus, three RGB phosphor dots 331, 332, 333 are formed for each pixel as shown in FIG. 8. A black matrix may be provided around these phosphor dots. In the case of a monochromatic display apparatus, only one phosphor dot is allocated to each pixel or the screen may be formed in a uniform structure without a one-to-one correspondence between the pixels and the phosphor dots. Appropriate conditions on the phosphor layer and the material of the phosphor are similar to those in the first embodiment.

The front plate 334 may use a glass plate, for example. It is preferred that an optical filter be provided on the front plate 334 which absorbs or reflects the excitation light emitted from the light source unit 310 and transmits only the luminescent light emitted from the phosphor layer. It is also desirable to provide an external light reflection prevention film.

In the display apparatus with the above construction, the Fabry-Perot interference may be used to modulate the excitation light emitted from the light source unit 310. That is, with two planes arranged parallel to face each other, the incident light is repetitively transmitted and reflected to form a number of parallel rays of light that cause interference. Let the angle between the incident light and the normal to the plane be $\theta$ and the distance between the two planes be t. Then, the difference x between the optical paths traveled by the transmitted light and the light that was reflected twice between the two planes is given by $x = 2nt \cdot \cos \theta$ if there is no phase change during the reflection, where n is a refractive index between the two planes.

When the optical path difference x is an integer number times the wavelength $\lambda$, the transmitted light rays intensify each other. When the optical path difference x is an odd number times the half-wavelength, the transmitted light rays weaken each other. Therefore, when $2nt \cdot \cos \theta = m\lambda$, the intensity of the transmitted light is maximum; and when $2nt \cdot \cos \theta = (2m+1)\lambda/2$, the intensity of the transmitted light is minimum. Here, m is an integer equal to or larger than zero. Where the Fabry-Perot interference is used, there is no need to make the flexible thin film 327 contact the lower electrode 323 for the excitation light from the light source unit 310 to pass through the flexible thin film 327 and the upper electrode 329. The flexible thin film 327 needs only to be displaced a predetermined distance.

Figure 9:
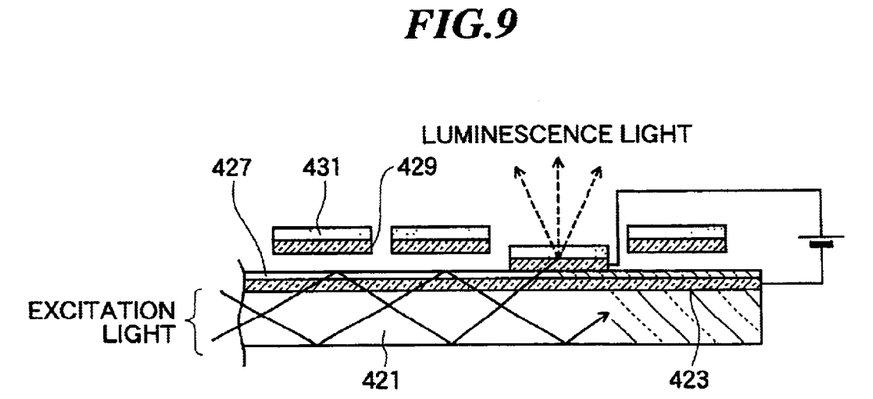
FIG. 9 is a cross section showing a display apparatus according to a fifth embodiment of the invention.

Next, a display apparatus according to the fifth embodiment of the invention will be described with reference to FIG. 9.

The fifth embodiment is a variation of the fourth embodiment and differs from the fourth embodiment in that the flexible thin film is conductive and serves as the upper electrodes, the direction of forming the lower electrodes and the upper electrodes is reverse, and the phosphor layer is formed over the upper electrodes. In other respects, the fifth embodiment is similar to the fourth embodiment.

In this embodiment, the light source may use an LED array, for example. The light from the LED array is introduced into a light guide 421. Over the light guide 421 a plurality of striplike transparent lower electrodes 423 are arranged parallel to each other at predetermined intervals. A transparent insulating layer 427 is formed over the lower electrodes 423. Though not shown, stays are formed between the adjacent lower electrodes.

On the upper end faces of the stays a plurality of striplike transparent flexible thin films 429 that are conductive and serve as the upper electrodes are formed parallel to each other at predetermined intervals, extending in a direction perpendicular to the lower electrodes 423. The flexible thin films 429 are spaced from the insulating layer 427. That is, a plurality of the lower electrodes 423 and a plurality of upper electrodes (flexible thin films 429) cross each other at right angles in a lattice pattern. Desired electrodes are selected and applied with a voltage to deflect the flexible thin films 429 downwardly in the figure by the Coulomb force.

At a location where the flexible thin film 429 is brought into contact with, or within a predetermined distance from, the insulating layer 427, the excitation light from the light source unit passes through the flexible thin film 429. At locations where the flexible thin films 429 are sufficiently spaced from the insulating layer 427, the excitation light is reflected by the insulating layer 427. In this way the excitation light can be modulated.

The flexible thin films 429 may use as their material semiconductors such as polysilicon, or electrode materials similar to those used in the fourth embodiment. A phosphor layer 431 is formed over the flexible thin films 429. Appropriate conditions on the phosphor layer and the material of the phosphor are similar to those in the first embodiment. Further, a transparent front plate may be provided over the phosphor layer 431.

Next, an example operating principle of the display apparatus of this embodiment will be explained. When there is a cavity (e.g., air) between the flexible thin films 429 and the insulating layer 427, if it is assumed that the cavity has the refractive index of 1 and the insulating layer 427 the refractive index of $n_w$, then the critical angle for total reflection on an interface with air (angle between the incident light and the perpendicular line to the interface) $\theta_c$ is given by $\theta_c = \sin^{-1}(1/n_w)$.

Therefore, when the angle of incidence with respect to the interface (angle between the incident light and the perpendicular to the interface) is $\theta > \theta_c$, the incident light propagates through the light guide 421 or the insulating layer 427 while undergoing the total reflection. When the flexible thin film 429 and the insulating layer 427 are brought into contact with each other or within a predetermined distance from each other, the incident angle becomes $\theta < \theta_c$, with the result that the incident light is conducted into the flexible thin film 429, passing through the flexible thin film 429 and going out from its upper side to excite the phosphor layer 431.

Figure 10:
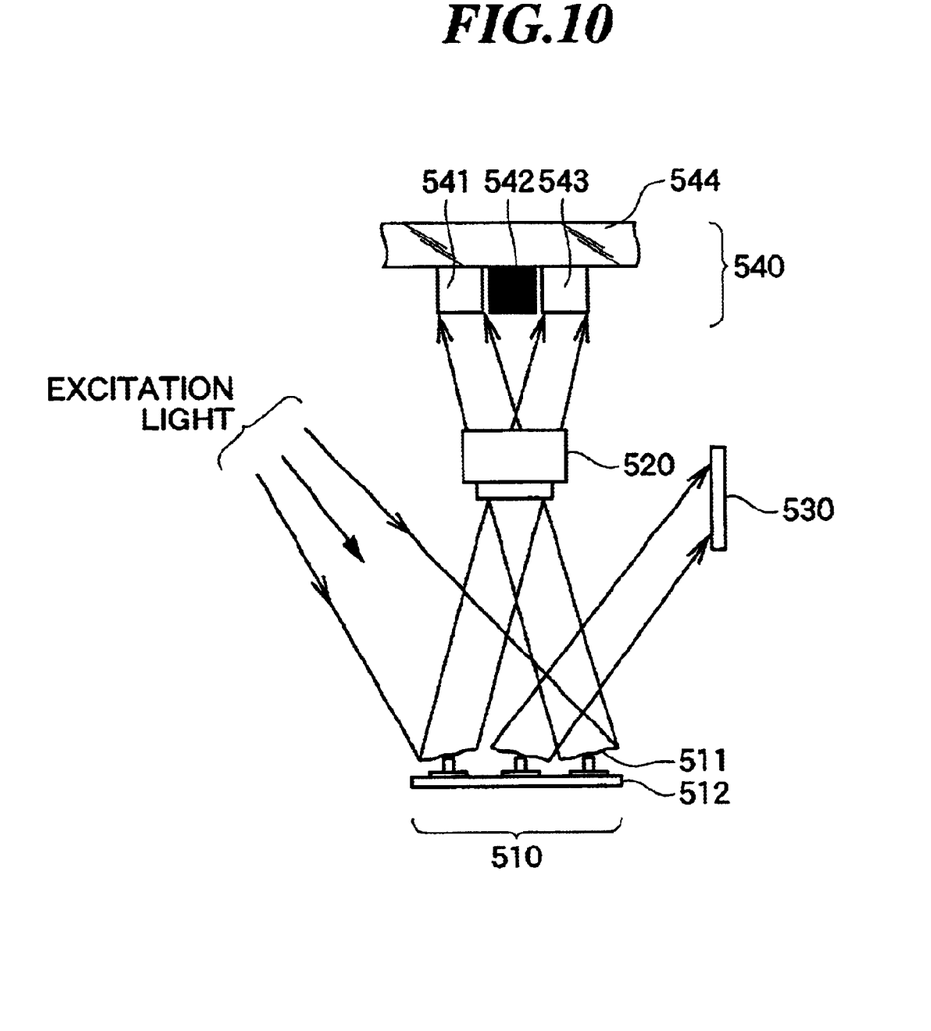
FIG. 10 illustrates a display apparatus according to a sixth embodiment of the invention.

Next, a display apparatus according to the sixth embodiment of the invention will be explained by referring to FIG. 10.

The sixth embodiment uses DMDs (digital micromirror devices) as an optical element 510. The excitation light strikes a substrate 512, on which the DMD devices are formed, at an angle of about 20 degrees to the normal to the substrate 512. The DMD devices have very small reflection surfaces 511 formed over the substrate 512. Tilting the small reflection surfaces by ±10 degrees determines whether the excitation light will enter a projection lens 520 or an optical absorbing member 530.

The excitation light incident on the projection lens 520 is projected onto the first surface of the fluorescent screen 540. The fluorescent screen 540 has a transparent front plate 544 and a phosphor layer including phosphor dots 541–543 formed over the front plate 544. The phosphor dots struck by the excitation light produces visible rays of light that go out from the second surface of the fluorescent screen 540 opposite the first surface. Appropriate conditions on the phosphor layer and the material of the phosphor in the fluorescent screen 540 are similar to those in the first embodiment.

As described above, in the display apparatus which radiates excitation light against the back of the phosphor layer to produce luminescent light from the front of the phosphor layer, the present invention enables an image having high sharpness, brightness and contrast with high efficiency. Hence, the display apparatus of this invention can be used on shallow-depth televisions and computers. Further, because it has no angle-of-view dependency, the display apparatus is very suited for diagnostic by monitoring in the medical equipment, for viewing art works, and for use in large information display equipment in airports.

What is claimed is:

1. A display apparatus comprising:
    a light source unit for generating excitation light having a predetermined wavelength;
    an optical element for modulating the excitation light generated by the light source unit for each of pixels in a two-dimensional plane; and
    a fluorescent screen for receiving the excitation light modulated by the optical element at a first surface and emitting visible light from a second surface opposite to the first surface, said fluorescent screen including a layer of phosphor having an absorption coefficient not smaller than $1 \times 10^2$ cm$^{-1}$ for the excitation light.

2. A display apparatus according to claim 1, wherein a thickness of said layer of phosphor is not larger than 120 μm.

3. A display apparatus according to claim 2, wherein the thickness of said layer of phosphor is not less than 7 μm.

4. A display apparatus according to claim 1, wherein said phosphor includes at least one of ZnO:Zn; $(Sr, Ca, Ba)_5(PO_4)_3Cl:Eu$; ZnS:Ag, Al; ZnS:Au, Ag, Al; ZnS:Cu, Au, Al; $(Zn, Cd)S:Ag$; $(Zn, Cd)S:Cu$; $Y_2O_3:Bi, Eu$; $LiEuW_2O_8$; $Ca_8Mg(SiO_4)_4Cl_2:Eu, Mn$; $Ba_2ZnS_3:Mn$; $Y_2O_2S:Eu$; $BaMg_2Al_{16}O_{27}:Eu$; $BaMg_2Al_{16}O_{27}:Eu, Mn$; $BaMgAl_{10}O_{17}:Eu$; $BaMgAl_{10}O_{17}:Eu, Mn$; $Sr_5,(PO_4)_3Cl:Eu$; $(Sr, Ba)SiO_4:Eu$; $SrGa_2S_4:Eu$; $K_5Eu_{25}(WO_4)_{6.75}$; ZnS:Cu, Al; and $3.5MgO \cdot 00.5MgF_2GeO_2:Mn$.

5. A display apparatus according to claim 1, wherein the fluorescent screen further includes second phosphor which is different from said phosphor and generates visible light upon receiving luminescent light from said phosphor.

6. A display apparatus according to claim 5, wherein said second phosphor includes at least one of $Y_3Al_5O_{12}:Ce$ and $Y_3(Al, Ga)_5O_{12}:Ce$.

7. A display apparatus comprising:
    a light source unit for generating excitation light having a predetermined wavelength;
    an optical element for modulating the excitation light generated by the light source unit for each of pixels in a two-dimensional plane; and
    a fluorescent screen for receiving the excitation light modulated by the optical element at a first surface and emitting visible light from a second surface opposite to the first surface, said fluorescent screen including a layer of phosphor in which a thickness of said layer of phosphor that gives a maximum brightness caused by the excitation light is not larger than 120 μm.

8. A display apparatus according to claim 7, wherein the thickness of said layer of phosphor that gives a maximum brightness caused by the excitation light is not larger than 80 μm.

9. A display apparatus according to claim 7, wherein the thickness of said layer of phosphor that gives the maximum brightness caused by the excitation light is not less than 13 μm.

10. A display apparatus comprising:
    a light source unit for generating excitation light having a predetermined wavelength;
    an optical element for modulating the excitation light generated by the light source unit for each of pixels in a two-dimensional plane; and a fluorescent screen for receiving the excitation light modulated by the optical element at a first surface and emitting visible light from a second surface opposite to the first surface, said fluorescent screen including a layer of phosphor in which a product of an absorption coefficient for the excitation light and a thickness of said layer of phosphor is within a range from 1 to 8.

11. A display apparatus according to claim 10, wherein the thickness of said layer of phosphor is not larger than 120 μm.

12. A display apparatus according to claim 11, wherein the thickness of said layer of phosphor is not less than 7 μm.

13. A display apparatus according to claim 10, wherein the product of the absorption coefficient and the thickness of said layer of phosphor is within a range from 2 to 4.

14. A display apparatus comprising:
  a light source unit for generating excitation light having a predetermined wavelength;
  an optical element for modulating the excitation light generated by the light source unit for each of pixels in a two-dimensional plane;
  a projection lens to project the excitation light modulated by the optical element; and
  a fluorescent screen for receiving the excitation light projected by the projection lens at a first surface and emitting visible light from a second surface opposite to the first surface, said fluorescent screen including a layer of phosphor having an absorption coefficient not smaller than $1 \times 10^2$ cm$^{-1}$ for the excitation light.

15. A display apparatus according to claim 14, wherein a thickness of said layer of phosphor is not larger than 120 μm.

16. A display apparatus according to claim 15, wherein the thickness of said layer of phosphor is not less than 7 μm.

17. A display apparatus according to claim 14, wherein the fluorescent screen further includes second phosphor which is different from said phosphor and generates visible light upon receiving luminescent light from said phosphor.

18. A display apparatus according to claim 17, wherein said second phosphor includes at least one of $Y_3Al_5O_{12}$:Ce and $Y_3(Al, Ga)_5O_{12}$:Ce.

19. A display apparatus comprising:
  a light source unit for generating excitation light having a predetermined wavelength;
  an optical element for modulating the excitation light generated by the light source unit for each of pixels in a two-dimensional plane;
  a projection lens to project the excitation light modulated by the optical element; and
  a fluorescent screen for receiving the excitation light projected by the projection lens at a first surface and emitting visible light from a second surface opposite to the first surface, said fluorescent screen including a layer of phosphor in which a thickness of said layer of phosphor that gives a maximum brightness caused by the excitation light is not larger than 120 μm.

20. A display apparatus according to claim 19, wherein the thickness of said layer of phosphor that gives a maximum brightness caused by the excitation light is not larger than 80 μm.

21. A display apparatus according to claim 19, wherein the thickness of said layer of phosphor that gives the maximum brightness caused by the excitation light is not less than 13 μm.

22. A display apparatus comprising:
  a light source unit for generating excitation light having a predetermined wavelength;
  an optical element for modulating the excitation light generated by the light source unit for each of pixels in a two-dimensional plane;
  a projection lens to project the excitation light modulated by the optical element; and
  a fluorescent screen for receiving the excitation light projected by the projection lens at a first surface and emitting visible light from a second surface opposite to the first surface, said fluorescent screen including a layer of phosphor in which a product of an absorption coefficient for the excitation light and a thickness of said layer of phosphor is within a range from 1 to 8.

23. A display apparatus according to claim 22, wherein the thickness of said layer of phosphor is not larger than 120 μm.

24. A display apparatus according to claim 23, wherein the thickness of said layer of phosphor is not less than 7 μm.

25. A display apparatus according to claim 22, wherein the product of the absorption coefficient and the thickness of said layer of phosphor is within a range from 2 to 4.

26. A display apparatus according to claim 22, wherein the phosphor includes at least one of ZnO:Zn; (Sr, Ca, Ba)$_5$(PO$_4$)$_3$Cl:Eu; ZnS:Ag, Al; ZnS:Au, Ag, Al; ZnS:Cu, Au, Al; (Zn, Cd)S:Ag; (Zn, Cd)S:Cu; Y$_2$O$_3$:Bi, Eu; LiEuW$_2$O$_8$; Ca$_8$Mg (SiO$_4$)$_4$Cl$_2$:Eu, Mn; Ba$_2$ZnS$_3$:Mn; Y$_2$O$_2$S:Eu; BaMg$_2$Al$_{16}$O$_{27}$:Eu; BaMg$_2$Al$_{16}$O$_{27}$:Eu, Mn; BaMgAl$_{10}$O$_{17}$:Eu; BaMgAl$_{10}$O$_{17}$:Eu, Mn; Sr$_5$, (PO$_4$)$_3$Cl:Eu; (Sr, Ba) SiO$_4$:Eu; SrGa$_2$S$_4$:Eu; K$_5$Eu$_{25}$ (WO$_4$)$_{6.75}$; ZnS:Cu, Al; and 3.5MgO·O0.5MgF$_2$GeO$_2$:Mn.

\* \* \* \* \*